(12) United States Patent
Hofmann et al.

(10) Patent No.: US 10,458,304 B2
(45) Date of Patent: Oct. 29, 2019

(54) METHOD FOR DIAGNOSING A QUALITY SIGNAL, CONTROL DEVICE, CONTROL DEVICE PROGRAM AND CONTROL DEVICE PROGRAM PRODUCT

(71) Applicant: Robert Bosch GmbH, Stuttgart (DE)

(72) Inventors: Jan Michl Hofmann, Ludwigsburg (DE); Reinold Weinmann, Esslingen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 15/844,844

(22) Filed: Dec. 18, 2017

(65) Prior Publication Data

US 2018/0171848 A1    Jun. 21, 2018

(30) Foreign Application Priority Data

Dec. 21, 2016  (DE) .......................... 10 2016 225 756

(51) Int. Cl.
*F01N 11/00* (2006.01)
*F01N 3/20* (2006.01)

(52) U.S. Cl.
CPC ........... *F01N 3/208* (2013.01); *F01N 3/2066* (2013.01); *F01N 11/002* (2013.01); *F01N 2550/02* (2013.01); *F01N 2550/05* (2013.01); *F01N 2610/02* (2013.01); *F01N 2610/148* (2013.01); *F01N 2900/0422* (2013.01); *F01N 2900/1818* (2013.01); *Y02T 10/24* (2013.01)

(58) Field of Classification Search
CPC ................. F01N 2900/0422; F01N 2900/1818
See application file for complete search history.

(56) References Cited

U.S. PATENT DOCUMENTS

| 2003/0033799 | A1  | 2/2003 | Scheying |  |
|---|---|---|---|---|
| 2014/0096586 | A1* | 4/2014 | Shen | ........................ G01F 25/00 73/1.24 |
| 2014/0157879 | A1* | 6/2014 | Zamani | ................ G01N 29/024 73/64.53 |

FOREIGN PATENT DOCUMENTS

| DE | 10139142 | 2/2003 |
|---|---|---|
| DE | 102015212622 | 1/2017 |

* cited by examiner

*Primary Examiner* — Jonathan R Matthias
(74) *Attorney, Agent, or Firm* — Michael Best & Friedrich LLP

(57) ABSTRACT

A method for diagnosing a quality signal (26). The quality signal (26) is provided by a quality sensor (24) used in a reagent metering system (10). The reagent metering system (10) meters a urea/water solution (14) stored in a tank (12), the quality of which is checked by the quality sensor (24), upstream of an SCR catalytic converter (20).

8 Claims, 1 Drawing Sheet

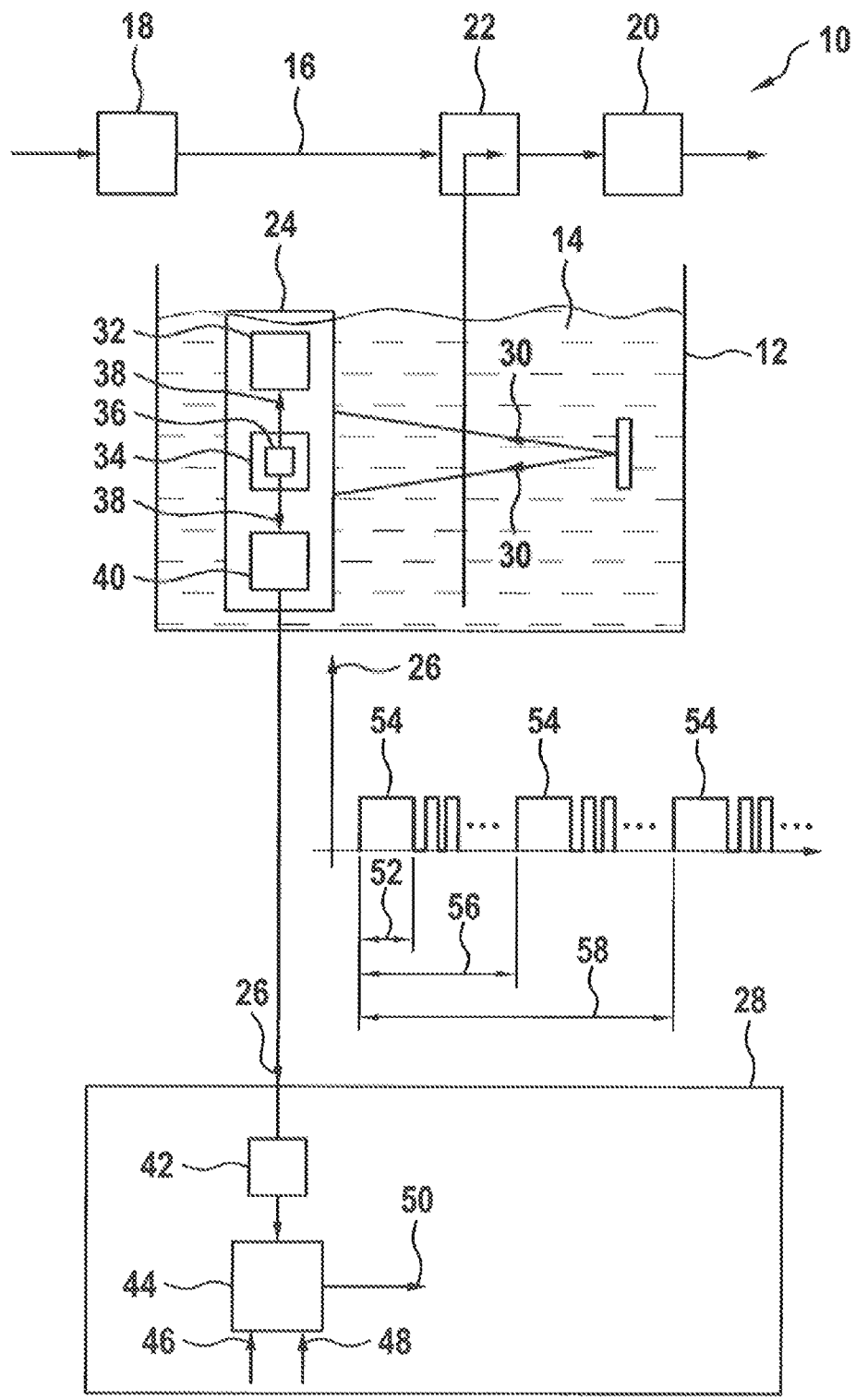

METHOD FOR DIAGNOSING A QUALITY SIGNAL, CONTROL DEVICE, CONTROL DEVICE PROGRAM AND CONTROL DEVICE PROGRAM PRODUCT

BACKGROUND OF THE INVENTION

The present invention relates to a method for diagnosing a quality signal which is provided by a quality sensor which is used in a reagent metering system, wherein the reagent metering system meters a urea/water solution into the exhaust gas duct of an internal combustion engine upstream of an SCR catalytic converter.

The invention further relates to a specially configured control device for carrying out the diagnosis method according to the invention.

Furthermore, the present invention relates to a control device program which executes all of the steps of the diagnosis method according to the invention when said control device program runs on a control device.

Finally, the present invention relates to a control device program product with program code, which is stored on a machine-readable carrier, for carrying out the diagnosis method according to the invention when the program is executed on a control device.

In order to adhere to the ever more stringent exhaust gas legislation, it is necessary to reduce nitrogen oxides in the exhaust gas of internal combustion engines, in particular of diesel engines. For this purpose, it is known for an SCR (Selective Catalytic Reduction) catalytic converter to be arranged in the exhaust gas duct of internal combustion engines, the said SCR catalytic converter reducing the nitrogen oxides ($NO_x$) contained in the exhaust gas of the internal combustion engine, in the presence of a reducing agent, to form nitrogen. In this way, the fraction of nitrogen oxide in the exhaust gas can be considerably reduced. Ammonia ($NH_3$) which is admixed to the exhaust gas is suitable for the reaction to take place. Therefore, $NH_3$ or reagents which split to form $NH_3$ are used as reducing agents. In general, for this purpose, use is made of an aqueous urea/water solution as a precursor of the reducing agent, which aqueous urea/water solution is injected into the exhaust gas duct upstream of the SCR catalytic converter. Ammonia, which acts as reducing agent, is formed from the said solution. A 32.5% aqueous urea solution is commercially available under the trade name AdBlue®.

The urea/water solution can be refilled by an operator of the internal combustion engine. A check to determine whether the refilled substance is actually the correct urea/water solution or whether the urea concentration in the urea/water solution corresponds to the relevant standard ISO 22241 or DIN 70070 ensures that the required $NO_x$ reduction rates are complied with. The legislature requires a check in order to be able to identify possible attempted fraud when refilling the urea/water solution and to initiate corresponding measures, such as limiting the number of possible internal combustion engine starting operations or reducing the internal combustion engine torque for example.

A quality sensor which detects the quality of the urea/water solution is provided for diagnosing the urea/water solution. A reagent metering system comprising a quality sensor of this kind is known, for example, from laid-open specification DE 101 39 142 A1.

Laid-open specification DE 10 2015 212 622 A1 (not previously published) describes a method and an apparatus for connecting a quality signal which is provided by an ultrasound quality sensor which is used in a reagent metering system. The ultrasound quality sensor ascertains the sound propagation time in a urea/water solution which is stored in a tank as a precursor of the reagent ammonia. The quality signal which is provided by the quality sensor is based on a time-based measurement.

The so-called SENT protocol, which has been specified by the "Society of Automotive Engineers" (SAE) under the name J2716 and can be viewed at www.SAE.org, was developed specially for transmitting sensor data, in particular in motor vehicle applications. The SENT protocol is also described with reference to analysis with an oscilloscope in the specialist journal "Elektronik Praxis", Vogel-Verlag, May 16, 2013, also published at http://www.elektronikpraxis.vogel.de/messen-und-testen/articles/405111.

The invention is based on the object of specifying a method and an apparatus for diagnosing a quality signal which is obtained on the basis of a time-based measurement, which is intended to ensure proper functioning of the quality sensor.

SUMMARY OF THE INVENTION

The method according to the invention for diagnosing a quality signal, which is provided by a quality sensor which is used in a reagent metering system, wherein the reagent metering system meters a urea/water solution, which is stored in a tank and the quality of which is checked by the quality sensor, upstream of an SCR catalytic converter, is distinguished in that the quality sensor contains a signal-processing arrangement with a clock generator which provides a clock signal, in that the quality sensor ascertains the quality signal with a time-based measurement on the basis of a clock signal, in that the quality signal is transmitted to a control device via an interface depending on the period duration of the clock signal, in that a measure of the period duration of the clock signal is ascertained in a signal evaluation means of the control device, in that the measure of the period duration is compared with at least one period duration threshold value, and in that a fault signal is provided when there is a deviation in the measure of the period duration of the clock signal from the period duration threshold value.

The procedure according to the invention allows diagnosis of the quality sensor for realizing on-board diagnosis. A requirement for this is that the quality sensor ascertains the quality signal with a time-based measurement. The time measurement is based on a clock signal of a clock generator. The quality signal is transmitted via an interface depending on the period duration of the clock signal. The clock signal or the period duration of the clock signal determines, for example, the durations of pulses which are transmitted via the interface, for example a serial interface, for example a serial SENT interface, wherein the clock-dependent pulse durations contain the information of the quality signal in encoded form.

It is therefore possible to diagnose the quality signal by evaluating the measure of the period duration of the clock signal because a faulty clock signal leads to a correspondingly faulty quality signal in the case of a time-based measurement.

The apparatus according to the invention relates to a special configuration of the control device for carrying out the diagnosis method according to the invention.

A control device program according to the invention is stored in the control device for diagnosing the quality signal.

A control device program product according to the invention with a program code, which is stored on a machine-readable carrier, executes the diagnosis method according to the invention when the program is executed on the control device.

Further advantageous developments and refinements of the diagnosis method according to the invention and of the apparatus according to the invention can be found in the description.

BRIEF DESCRIPTION OF THE DRAWINGS

Exemplary embodiments of the invention are illustrated in the drawing and explained in greater detail in the following description.

The FIGURE shows a reagent metering system in which a method according to the invention for diagnosing a quality sensor which is used in the reagent metering system runs.

DETAILED DESCRIPTION

The FIGURE shows a reagent metering system 10 which meters a urea/water solution 14, which is stored in a tank 12, into an exhaust gas duct 16 of an internal combustion engine 18 upstream of an SCR catalytic converter 20. The internal combustion engine 18 is provided, for example, as a drive motor in a motor vehicle. Ammonia ($NH_3$), which serves as a reducing agent in the SCR catalytic converter 20 for reducing $NO_x$ components of the exhaust gas of the internal combustion engine 18, is produced in the exhaust gas duct 16 from the urea/water solution 14 at high temperature.

The required metering rate of the urea/water solution 14 is preferably defined by means of a metering valve 22.

A quality sensor 24, which ascertains a quality signal 26 and supplies the said quality signal to a control device 28, is provided for diagnosing the urea/water solution 14 to the correct concentration of the urea component.

The urea/water solution 14 is subject to an ageing process in which the urea/water solution 14 decomposes, wherein ammonia is produced, so that the urea concentration is reduced. Furthermore, it is not possible to prevent the urea/water solution 14, when it is refilled, from being manipulated by, for example, the water content being increased. The urea concentration is also reduced in this case. However, at a reduced urea concentration of the urea/water solution 14, an excessively low effective metering rate is achieved at a prespecified metering rate by the metering valve 22, so that the $NO_x$ reduction in the SCR catalytic converter 20 no longer reaches the maximum possible values, as a result of which prespecified $NO_x$ concentrations downstream of the SCR catalytic converter 20 may possibly no longer be complied with. The urea concentration of the urea/water solution 14 should be approximately 32.5% by weight in line with the standard ISO 22241 or DIN 70070.

The quality sensor 24 carries out a time-based measurement. A suitable method is, for example, an ultrasound measurement in which the signal propagation time of an ultrasound signal 30 is detected. For this purpose, the quality sensor 24 contains an ultrasound sensor 32 and a signal-processing arrangement 34 which contains a clock generator 36 which provides a clock signal 38. The ultrasound sensor is described in detail in laid-open specification DE 10 2015 212 622 A1 which was mentioned in the introductory part and to which reference is made.

The clock signal 38 is supplied both to the ultrasound sensor 32 and also to a first interface 40.

The first interface 40 provides the quality signal 26 which is transmitted to the control device 28 and is received there by a second interface 42. The transmission of the quality signal 26 is intended to be coupled to the time of the clock signal 38 which is provided by the clock generator 36. Transmission of this kind is possible, for example, via a serial interface, for example with the SENT protocol which was mentioned in the introductory part.

The dependence of the quality signal 26, which is transmitted via the interface 40, 42, on the clock signal 38 allows the control device 28 to evaluate the clock signal 38 or the period duration of the clock signal 38.

The FIGURE illustrates the time profile of the quality signal 26 as part of a serial data transmission operation, for example with the SENT protocol.

The diagnosis according to the invention is based on ascertaining and evaluating a measure of the period duration or the frequency of the clock signal 38 in the control device 28 since, when there is a deviation in the period duration from a setpoint value, it is possible to conclude that there is not only a faulty clock signal 38 but rather, correspondingly, also a faulty time-based measurement by the quality sensor 24.

The control device 28 contains a signal evaluation means 44 which is supplied with a first and a second period duration threshold value 46, 48 and which provides a fault signal 50 in the event of a fault.

By way of example, the duration 52 of a synchronization pulse 54, for example of the SENT protocol, can be used as a measure 52, 56, 58 of the period duration of the clock signal 38. As an alternative or in addition, the time interval 56 between two immediately successive synchronization pulses 54, for example of the SENT protocol, can form the basis for the evaluation. As an alternative or in addition, a further time interval 58 between two synchronization pulses 54, for example of the SENT protocol, can form the basis for evaluating the measure of the period duration of the clock signal 38, wherein there are a large prespecified number of synchronization pulses 54 within the further time interval 58.

The measure 52, 56, 58 of the period duration of the clock signal 38 can be compared with one or with two period duration threshold values 46, 48 in the signal evaluation means 44. The fault signal 50 is provided when the measure 52, 56, 58 of the period duration of the clock signal 38 is above the first period duration threshold value 46 or when the measure 52, 56, 58 for the period duration of the clock signal 38 is below the second period duration threshold value 48.

The fault signal 50 can be processed and/or, for example, displayed in a further signal-processing arrangement. A fault signal 50 having occurred means that a deviation has occurred in the period duration of the clock signal 38 and that, as a result, a faulty quality signal 26 has been transmitted from the quality sensor 24 to the control device 28. When a fault signal 50 has occurred, it is necessary to check the quality sensor 24 which can be repaired or replaced. A possibly prescribed on-board diagnosis can be carried out by means of the fault signal 50.

The invention claimed is:

1. A method for diagnosing a quality signal (26) provided by a quality sensor (24) used in a reagent metering system (10), wherein the reagent metering system (10) meters a urea/water solution (14) stored in a tank (12) the quality of the urea/water solution (14) is checked by the quality sensor (24), upstream of an SCR catalytic converter (20), wherein the quality sensor (24) includes a signal-processor (34) having a clock generator (36) which provides a clock signal (38), wherein the quality sensor (24) ascertains the quality signal (26) on the basis of a time-based measurement, the method comprising:
- transmitting the quality signal (26) to a controller (28) via an interface (40, 42);
- ascertaining a measure (52, 56, 58) of the period duration of the clock signal (38) in the controller (28) based on the period duration of the clock signal (38);
- comparing the period duration with at least one period duration threshold value (46, 48); and
- providing a fault signal (50) when there is a deviation in a measure (52, 56, 58) of the period duration of the clock signal (38) from the period duration threshold.

2. The method according to claim 1, characterized in that two period duration threshold values (46, 48) are prespecified, and in that the fault signal (50) is provided when the measure (52, 56, 58) of the period duration exceeds an upper period duration threshold value (46) or falls below a lower period duration threshold value (48).

3. The method according to claim 1, characterized in that the quality signal (26) is transmitted via a SENT interface (40, 42).

4. The method according to claim 1, characterized in that the measure (52, 56, 58) for the period duration is ascertained from the duration (52) of a synchronization pulse (54) of the interface (40, 42).

5. The method according to claim 1, characterized in that the measure (52, 56, 58) of the period duration is ascertained from the time interval (56, 58) between two synchronization pulses (54) of the interface (40, 42).

6. The method according to claim 1, characterized in that the quality sensor (24) evaluates the propagation time of an ultrasound signal (30) which passes through the urea/water solution (14), and in that a measure of the propagation time is transmitted via the interface (40, 42).

7. A non-transitory machine-readable medium having a program code for diagnosing the quality signal (26) according to claim 1 when the program code is executed on the controller (28).

8. A controller (28) for diagnosing a quality sensor (24) which is used in a tank (12) of a reagent metering system (10), wherein the reagent metering system (10) meters a urea/water solution (14) stored in a tank (12) the quality of the urea/water solution (14) is checked by the quality sensor (24), upstream of an SCR catalytic converter (20), wherein the quality sensor (24) includes a signal-processor (34) having a clock generator (36) which provides a clock signal (38), wherein the quality sensor (24) ascertains the quality signal (26) on the basis of a time-based measurement, the controller (28)
- receiving the quality signal (26) via an interface (40, 42);
- ascertaining a measure (52, 56, 58) of the period duration of the clock signal (38);
- comparing the period duration with at least one period duration threshold value (46, 48); and
- providing a fault signal (50) when there is a deviation in a measure (52, 56, 58) of the period duration of the clock signal (38) from the period duration threshold.

* * * * *